Fig. 2.

March 17, 1936.  A. BROADMEYER  2,034,648
RULING MACHINE
Filed July 31, 1931    9 Sheets-Sheet 5

Inventor
Albert Broadmeyer,
By
Attorney

Patented Mar. 17, 1936

2,034,648

UNITED STATES PATENT OFFICE 2,034,648

RULING MACHINE

Albert Broadmeyer, Harrisburg, Pa., assignor to W. O. Hickok Manufacturing Company, Harrisburg, Pa., a corporation of Pennsylvania Application July 31, 1931, Serial No. 554,346

10 Claims. (Cl. 33—32)

In that type of ruling machines, known as dual-L where "striking" is done on the second machine, for many years in the practical art it has been thought necessary that the second machine should be driven from and by the first in order to obtain a so-called timed relation that insures the sheets operated on by the second machine being properly positioned with respect to those operated on by the first machine.

The object of the present invention is to provide mechanism in which such a cooperative drive between the two machines is unnecessary and this is accomplished by equipping the second machine so that it will take the sheets ruled by the first machine and operate on them, the second machine being a self-contained unit equipped so that it will thus receive the sheets and having its own operating drive and provided with means for feeding to it the ruled sheets of the first machine.

Figures 1, 17:
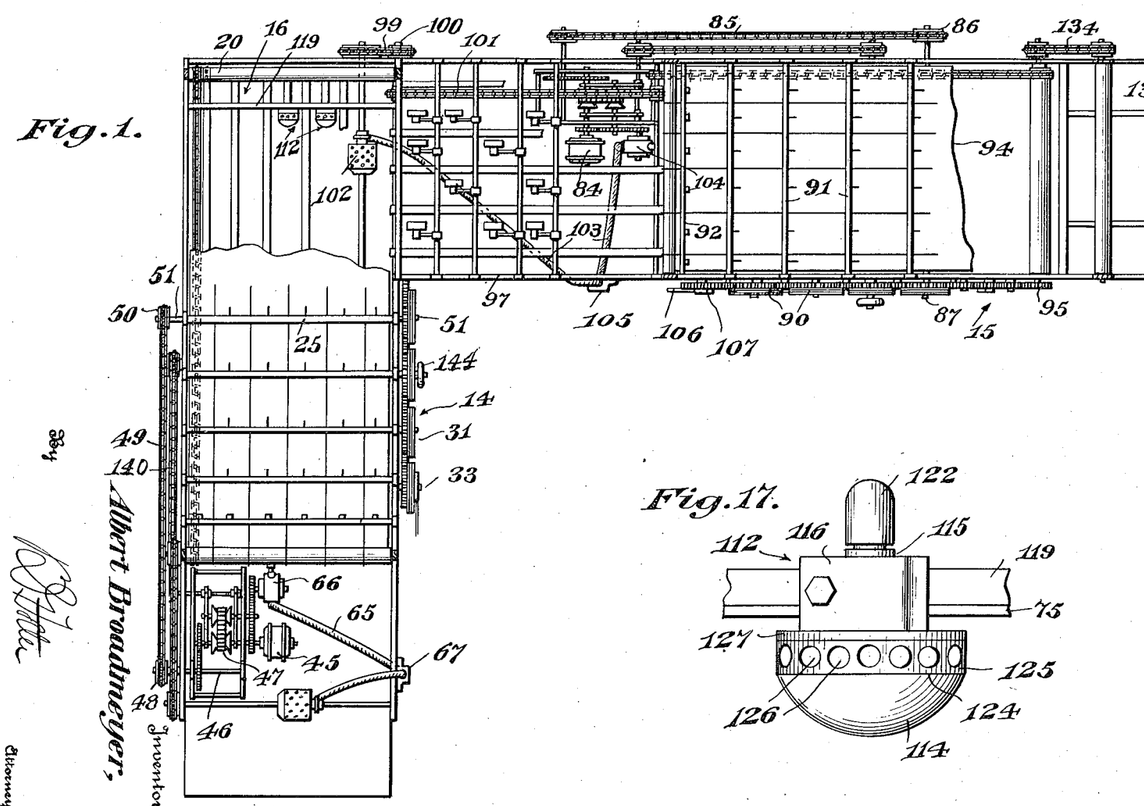
Figure 1 is a plan view schematic in character of a dual-L ruling machine constructed in accordance with the present invention.
Figure 17 is a top view of the control wheel.

In the embodiment disclosed, a first ruling machine designated 14 and a second ruling machine 15 are employed, the two being located at right angles and creating a "corner" designated 16. The first machine 14 may be of any desired character, but for the purposes of manufacture the two machines are substantially duplicates.

Figure 2:
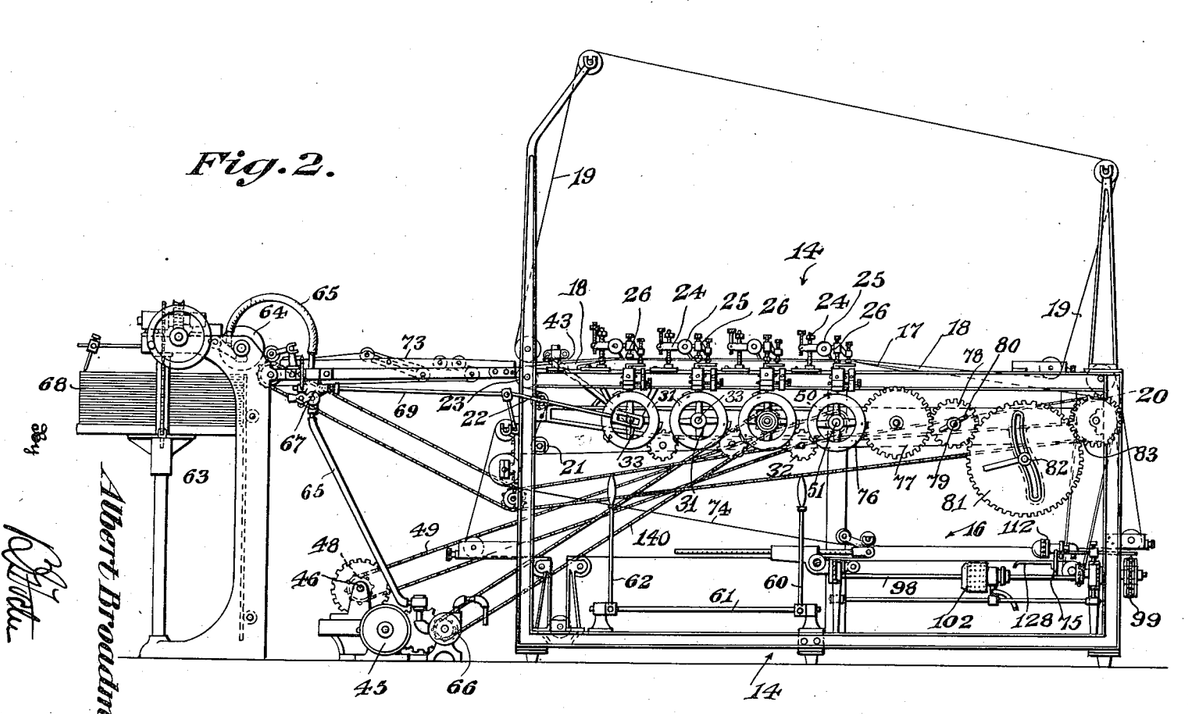
Figure 2 is a side elevation of the first machine or the machine that initially operates on the sheets.

The first machine 14 includes a table 17 over which passes rearwardly the upper stretch of an endless conveyor cloth 18, coacting with which are the lower stretches of cords or strings 19. The cloth 18 passes downwardly around a rear roller 20 and thence back to the front end of the machine and upwardly around rollers 21, 22, and 23 where it returns over the table 17. This structure is well known.

Mounted on suitable supports 24 are swinging pen carrying beams 25 having arms 26 comprising screw stems 27 that are adapted to rest on vertically movable plungers 28 (see Figure 12), the lower ends of these plungers carrying rollers 29 that are operated on by cams 30 carried by cam wheels 31. The cam wheels 31 are geared together as shown at 32 (see Figure 4), so that they rotate together at relatively fixed rates of speed.

Figure 4:
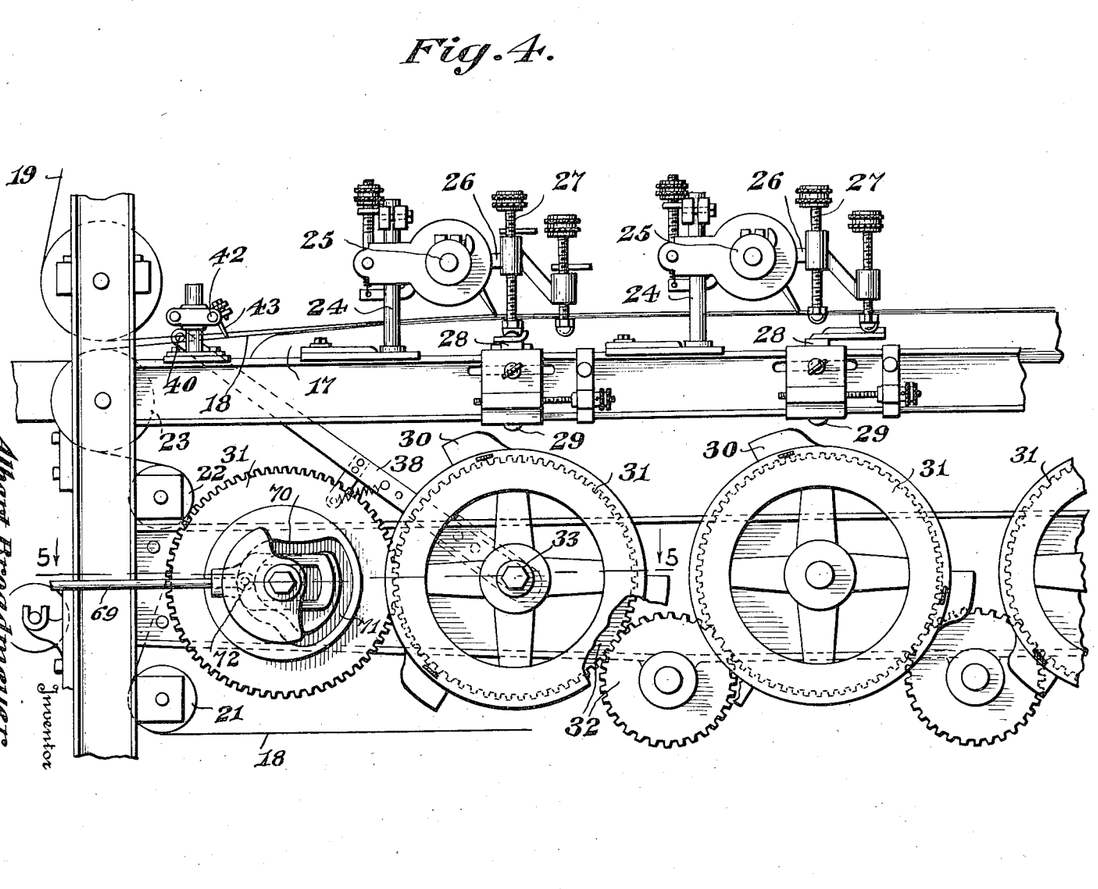
Figure 4 is a detail side elevation of a portion of the ruling instrumentalities of the first machine and the controlling gate together with the operating means therefor.
Figures 5, 6, 7, 8:
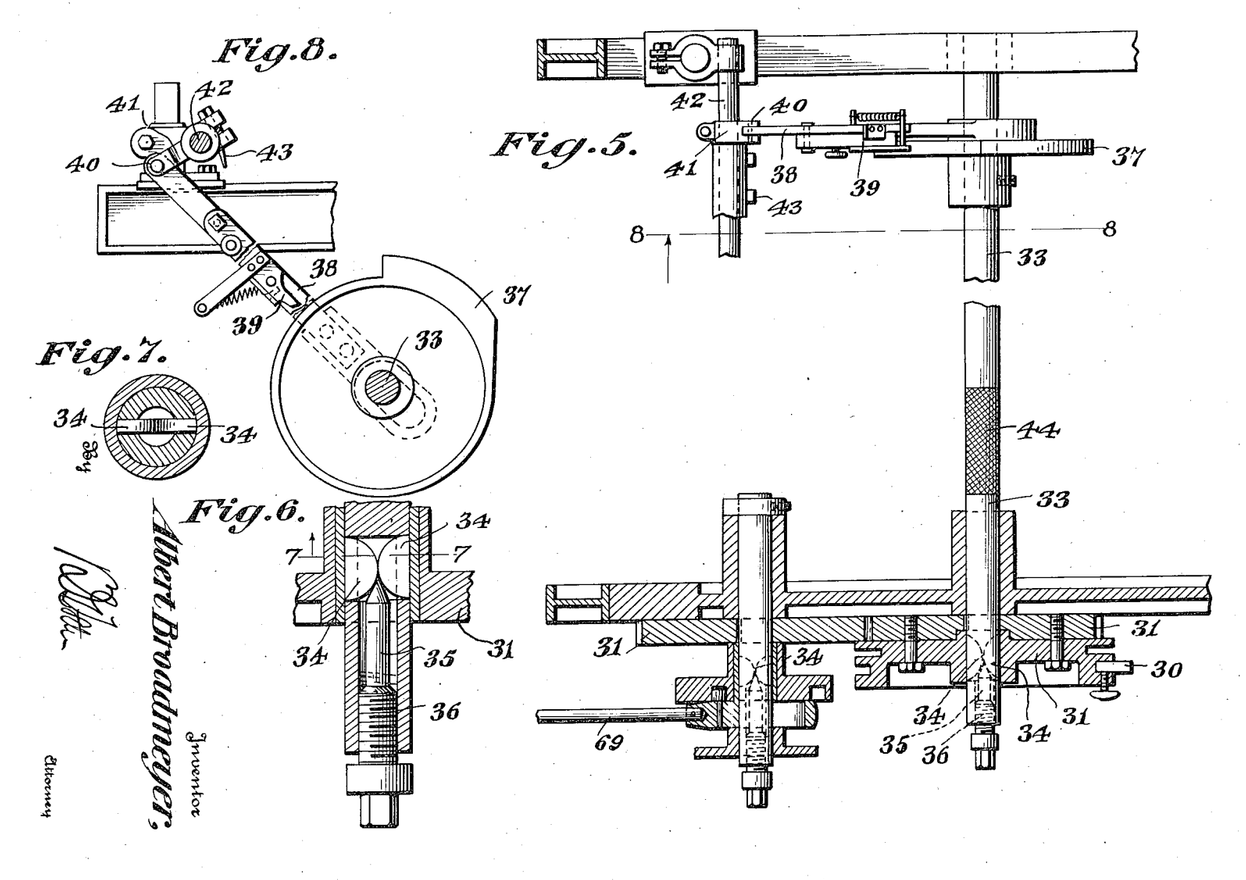
Figure 5 is a plan view of the cam mechanism including the operating means for the gate and is taken on the line 5—5 of Figure 4.
Figure 6 is a detail sectional view of the cam shaft shown in Figure 5 to illustrate the clutch mechanism for securing it to the driving cam.
Figure 7 is a detail sectional view on the line 7—7 of Figure 6.
Figure 8 is a cross sectional view on the line 8—8 of Figure 5 and illustrating the gate operating mechanism.

The cam wheel 31, which is nearest the front end of the machine, is mounted on a shaft 33 which as shown in Figure 5 is adapted to be clutched to the cam wheel 31. To this end said shaft carries a pair of clutch keys 34 having inner rounded edges opposed to each other, their outer edges being adapted to bear against the internal face of the hub of the wheel 31. The clutch keys 34 are forced outwardly by a wedge pin 35 having a threaded engagement at 36 with the end of the shaft. Obviously when the wedge pin is forced inwardly it spreads apart the keys 34 and causes them to clutch the cam wheel 31, so that the two will become locked together. The rear end of this shaft 33 has fixed to it a cam 37 and slidably mounted alongside the cam is an arm 38 provided with a bearing box 39 that is adapted to be engaged by the cam during its rotation to move the link 38 in a longitudinal direction. This link is pivoted at 40 to a crank arm 41 on a rock shaft 42, and the rock shaft is provided with gate fingers 43 that are thus lowered upon and raised from the cloth 18 in advance of the ruling devices. The shaft 33 is preferably provided with a roughened portion 44 by which it can be readily turned when the clutch keys 34 are released from the cam wheel 31. Consequently it will be clear that the cam 37 which operates the gate, can be adjusted with respect to the cam wheel 31 and consequently with all the cam wheels geared thereto.

Figure 13:
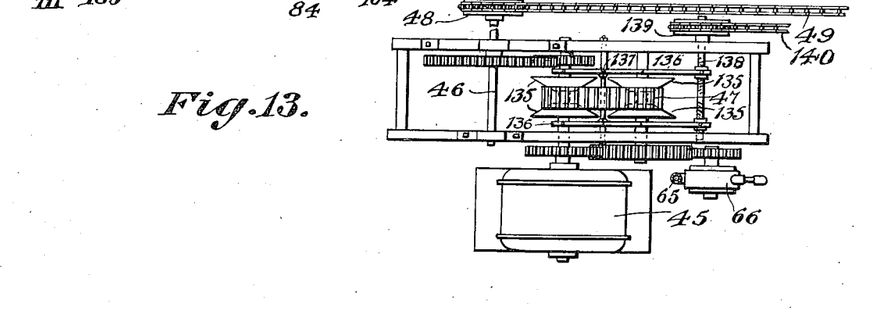
Figure 13 is a detail plan view of the motor drive mechanism that is preferably employed.

For the purpose of driving the mechanism, a motor 45 is employed which drives a countershaft 46 through a change speed gear 47 (see Figure 13). The counter-shaft 46 has a sprocket wheel 48 around which passes an endless sprocket chain 49 that in turn operates on a sprocket wheel 50 loosely mounted on a drive shaft 51. This drive shaft 51 carries the rearmost cam wheel 31.

Figures 11, 12:
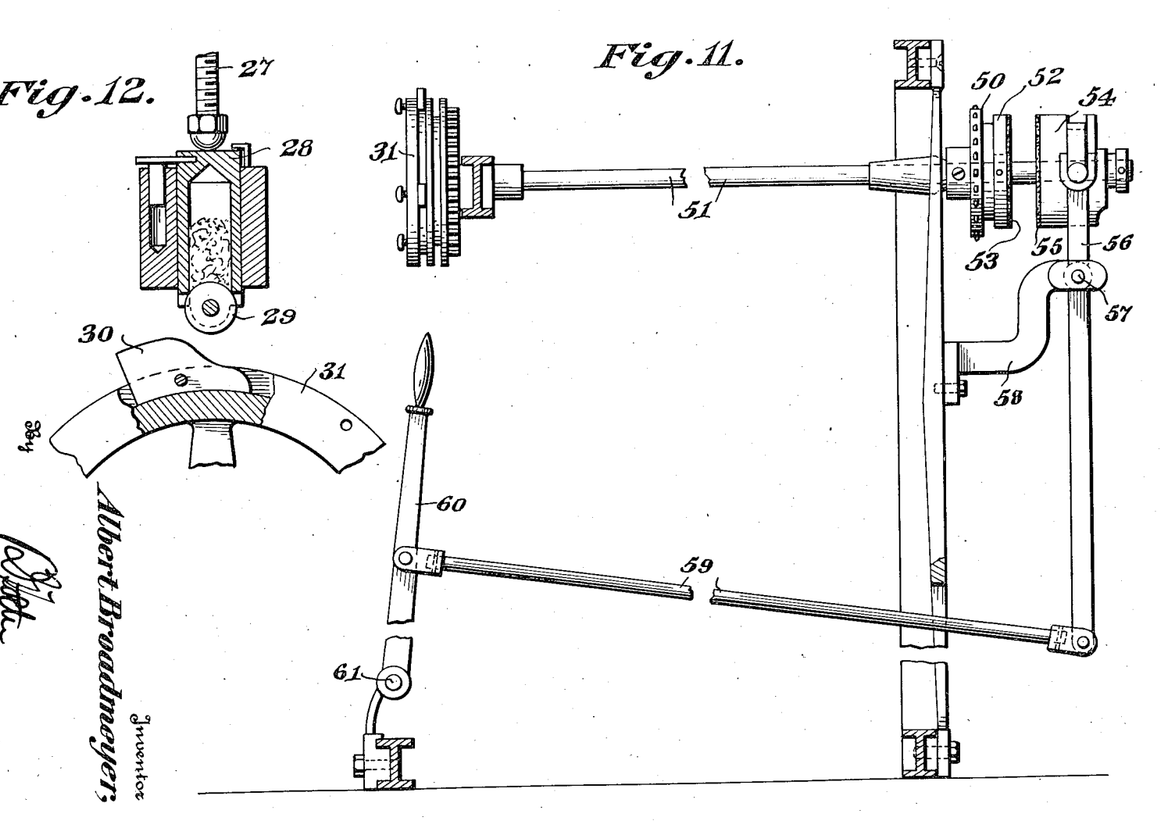
Figure 11 is a cross sectional view on the line 11—11 of Figure 9, illustrating the drive shaft and the clutch connection for effecting its operation.
Figure 12 is a detail view illustrating one of the pen beam operating devices.

Now referring to Figure 11, it will be noted that the sprocket wheel 50 carries a clutch member 52 provided with a friction face 53. Slidably keyed to the drive shaft 51 is a cooperating clutch member 54 provided with a friction face 55. The clutch member 54 is shifted into and out of coaction with the clutch member 52 by a lever 56 fulcrumed, as shown at 57, on a bracket 58 mounted on the frame of the machine. The lever 56 has a link connection at its lower end and as shown at 59 with a hand lever 60 journaled on a rock shaft 61 on the front side of the machine. The shaft 61 preferably has a second hand lever 62 for convenience. It will be evident that by operating either lever 60 or 62, the driving sprocket wheel 50 can be clutched to or unclutched from the drive shaft 51, thereby controlling the operation of said shaft. Obviously when the shaft is in operation the cam wheels 31 are actuated to effect the operation of the pen beam in a well known manner and the gate is also periodically operated by the cam 37.

Sheets are fed to the first machine 14 from an automatic feeder designated generally by the reference numeral 63, and this being of a well known type, it is thought needs no detail explanation. It is provided with a suction roller 64 that is connected by a suction conduit 65 with an exhaust pump 66. In the conduit 65 is a controlling valve 67 that is periodically operated to cut off and permit communication between the suction pump 66 and the suction roller 64, so that said roller periodically becomes operative to start sheets from the pile 68 into the ruling machine. The valve 67 is reciprocated through link mechanism 69 by a cam 70 geared to the foremost cam wheel 31, said cam 70 having a cam groove 71 in which is engaged a member 72 carried by the linkage 69. Thus the valve 67 and consequently the suction roller 64 operates in timed relation with the gate and pen beams.

Considering the operation of the first machine, as thus far described, sheets are successively picked up by the suction roller 64 from the top of the pile 68 and are delivered through suitable conveying mechanism, indicated at 73 to the gate 43. At the proper time the gate 43 is raised and a sheet that is against the same is carried by the conveyor cloth 18 beneath the various pen beams, the pens of which operate to rule the sheets in a manner well understood. The sheet having been carried downwardly around the rear roller 20 is brought forward beneath the table and is delivered on to a rearwardly moving conveyor 74 by which it is delivered into the corner 16. Here it strikes a stop 75 and each sheet as it arrives, is now in position to be carried out of the corner 16 into the second machine 15.

Figures 9, 10, 13A:
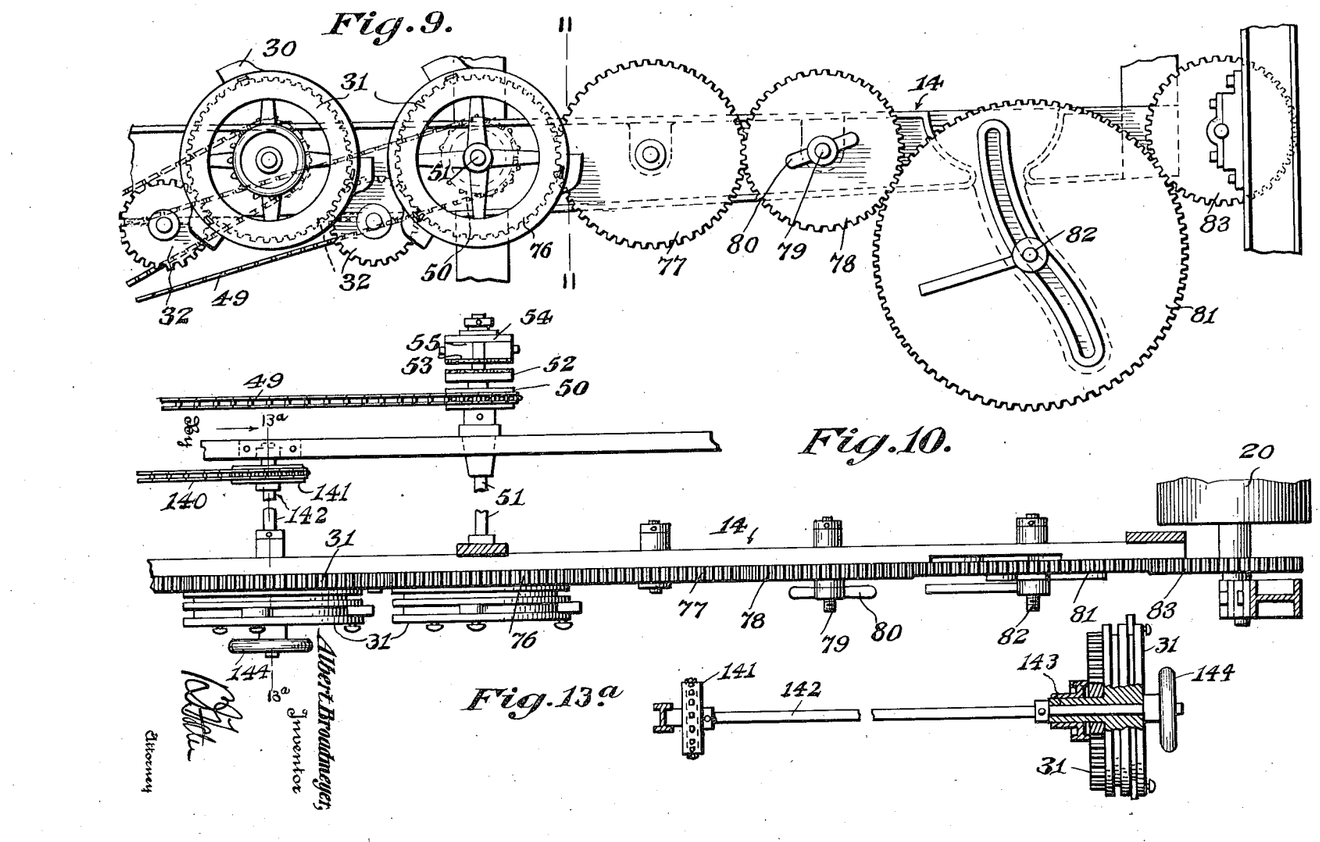
Figure 9 is a side elevation of the cam mechanism drive and the change speed gear for the sheet conveyor.
Figure 10 is a plan view of the structure shown in Figure 9.
Figure 13a is a detail sectional view on the line 13a—13a of Figure 10.

While the cam mechanisms as already shown and explained operate at a common rate of speed, it is desirable that the speed of the conveying mechanism be varied, so that sheets of varying sizes and shapes can be properly operated on and at a maximum rate of speed without unnecessary loss of space between the sheets. To this end the roller 20 is driven from the drive shaft 51 through a change speed gearing. Therefore the shaft 51 is provided on its front end with a gear 76 meshing with an idler gear 77. The gear 77 is adapted to be engaged by any one of a set of changeable gears 78 that can be detachably mounted on a gudgeon 79 and held by a suitable hand operated nut 80. To accommodate gears 78 of different diameters a gear 81 is provided having an adjustable mounting 82 and this gear is in mesh with a gear 83 on the cloth roller 20. Thus the cloth roller is driven from the drive shaft 51, and obviously by putting in gears 78 of different diameters, the speed of the cloth roller and consequently of the cloth and its cooperating elements can be varied.

As already stated, the two machines 14 and 15 in the present embodiment are substantially duplicates and the above description for the first essentially applies to the second.

Figure 3:
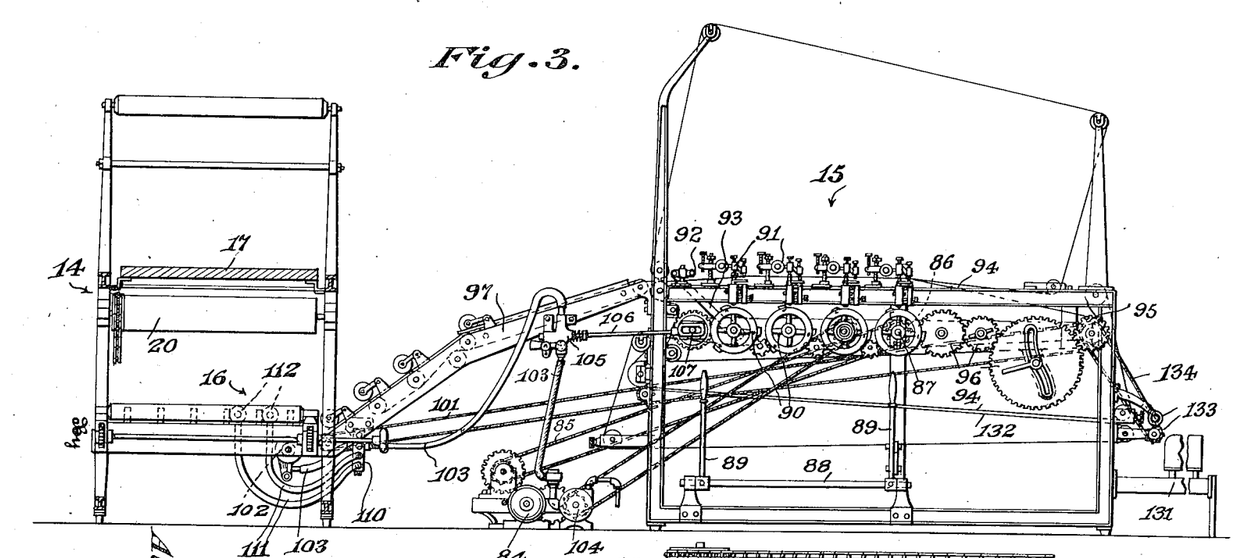
Figure 3 is a side elevation of the second machine, the first machine being illustrated in cross section to show the relation of the feeder of the second machine with respect thereto.

Thus in the second machine and as shown more particularly in Figure 3, a motor drive 84 similar to the motor drive of the first machine, but entirely independent thereof, is utilized. The motor mechanism operates a sprocket chain 85 that actuates a sprocket wheel 86 on a drive shaft 87 and to which it may be clutched by the mechanism corresponding in all respects to that shown in Figure 11. The rock shaft for said clutch mechanism is shown at 88 and has handle levers 89.

The drive shaft 87 operates the cam wheels 90 which in turn actuate pen beams 91, and a gate 92 is operated through link mechanism 93 corresponding to that shown in Figure 8. The endless cloth that carries the sheets to and beneath the gate 92 and beneath the pen beams 91 is designated 94 and operates around a rear roller 95 which is driven from the shaft 87 by change speed gearing 96 similar to that shown in Figure 9.

In this connection the front end of the second machine is intended to be the end that receives the sheets and the rear end is the end at which the sheets after being ruled are delivered to the layboy. It will be noted that the drive shaft 87 is rearwardly of the front end or on an intermediate part, that the pen beam cam wheels 90 driven thereby are in advance of the drive shaft 87, or in other words nearer the front or sheet-receiving end and that the change speed gearing 96 by which the cloth roller 95 is driven from said drive shaft 87 is rearwardly of said drive shaft.

Figure 14:
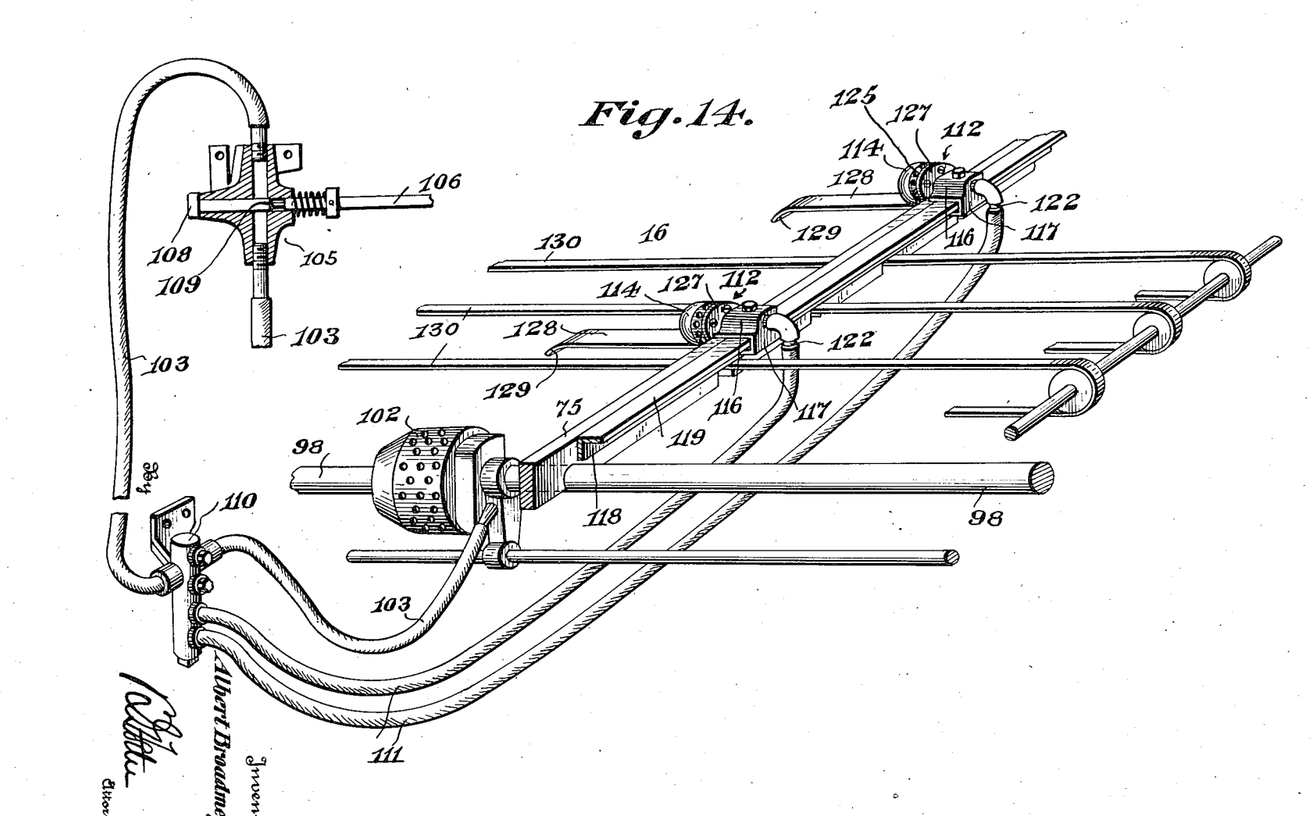
Figure 14 is a perspective view of the feeder mechanism for the second machine.

Means both operated and controlled by the second machine 15 starts the sheets that have been ruled by the first machine out of the corner 16 and to the second machine. Extending from said corner 16 to the second machine 15 is a conveyor commonly termed a toboggan and designated 97. At the lower end of said toboggan and at the outer side of the corner is a shaft 98 disposed at right angles to the shafting, conveyors, pen beams, etc. of the first machine 14. The shaft 98 is connected by sprocket gearing 99 with an adjacent conveyor shaft 100 forming the advance shaft of the toboggan conveyor and the shaft 100 is driven by a sprocket chain 101 (see Figure 3) from the cloth roller 95 so that the speed of the toboggan conveyor and the speed of the shaft 98 corresponds to the speed of the conveyor cloth 94 and the speed of all of these elements is altered by an alteration of the change speed gearing 96. On the shaft 98 is a suction roller 102 connected by a suction conduit 103 with an air exhaust pump 104. In the conduit 103 is a controlling valve 105 having a link connection 106 with a cam mechanism 107 geared to the cam wheels 90 and driven at a predetermined rate of speed with respect thereto.

The valve 105 is that now in general use, being in the form of a plunger 108 that is provided with a reduced portion 109 adapted to be brought in line with the passageway through the valve casing and conduit, and moved out of such alinement, thereby alternately establishing communication between the pump 104 and the suction roller 102 and cutting off such communication.

In the conduit 103 between the suction roller 102 and the valve 105 is a header 110 and from the chamber of this header extend vent conduits 111 to vent relief devices designated generally by the reference numeral 112. Two are shown, though any desired number may be employed depending on the amount of vacuum created and to be controlled.

Figures 15, 16:
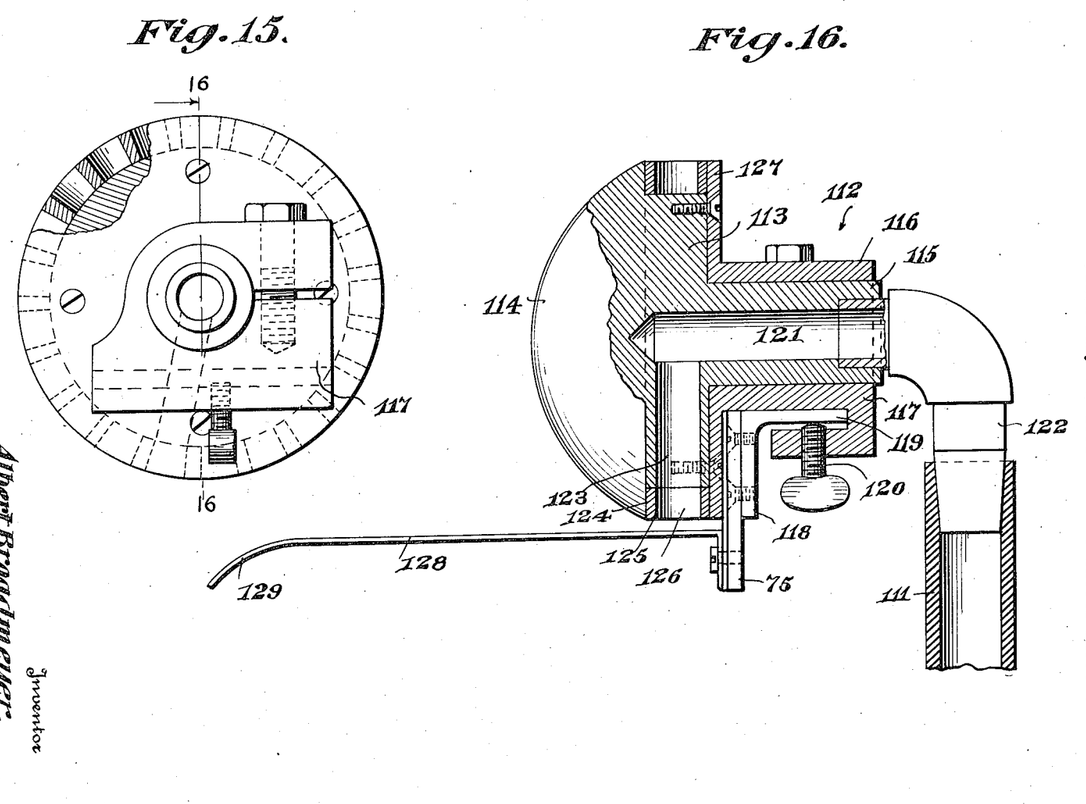
Figure 15 is a rear elevation of one of the suction control wheels.
Figure 16 is a sectional view on the line 16—16 of Figure 15.

Referring to Figures 15 and 16, it will be noted that each of the relief devices 112 comprises a body 113 having a semi-spherical head 114 extending forwardly, said body having a rear shank 115. The shank 115 is secured in a split clamp 116 formed upon a bracket 117. An angle bar 118 fastened to the rear side of the stop bar 75 is provided with a rearwardly extending flange 119 that is embraced by the bracket and is fixed by a set screw 120. The bracket and thus the relief device is adjustable along the bar and can be fixed in any position desired.

Formed longitudinally through the shank is a passageway 121 that extends into a nipple 122 on which one of the pipes 111 is mounted. In the body 113 is a downwardly opening port 123 that is in communication with the passageway 121. The port 123 opens into an annular channel 124 formed at the rear side of the body, and rotatably mounted in the said channel is a ring 125 having a series of annular ports 126 that successively register with the port 123 as the ring rotates. Said ring is held in place by a retaining plate 127 located behind it and secured to the rear side of the body 113. Beneath the vent device and extending in advance of the same is a guide plate 128 having a downturned front end 129. These plates are located between the conveyor tapes 130 that carry the sheets in the corner against the stop bar 75.

At the rear end of the second machine 15 is th usual layboy 131. The lower conveyor 132 which receives the sheets from the upper cloth 94 delivers the sheets which have now been ruled by both machines to said layboy. The final rollers 133 that act on the sheets to discharge them into the layboy 131 are preferably driven by a sprocket chain 134 from the cloth roller 95, so that the speed of the parts is varied with the speed of the conveyor cloth.

The operation of the second machine is as follows: When a sheet arrives in the corner 16 against the stop 75, if the second machine is in operation, at a proper time with respect to the gate and pen beams of the second machine, the valve 108 opens, thus creating a vacuum in the header 110. The margin of the sheet against the stop 75 is beneath the ports 126 of the controlling devices 112 that are in register with the port 123, and the sheet will consequently close the ports 126 to atmosphere. At the same time vacuum is created in the lower part of the suction roller 102, and the sheet is consequently caused to adhere to said roller. As this rotates the sheet is carried out of the corner, the rings 125 freely rotating to permit the movement of the sheet without material resistance. The sheet is then caught by the toboggan conveyor and and brought up to the gate 92. This gate opens at the proper time and permits the sheet to be carried rearwardly by the cloth 94 beneath the pen beams 91, and thence is carried by the conveyor mechanism and discharged in the layboy. If a sheet has not completely entered the corner and been brought against the stop 75 when the valve 108 opens, it will be evident that the ports 126 will not be closed and consequently the necessary vacuum in the roller 102 will not be created so that even if a sheet is under the roller 102, but is not properly positioned, it will not be brought out of the corner, but will be conveyed and properly positioned when the next action of the valve takes place. This is important when it is considered that the two ruling machines are independent entities and the drive of one does not depend in any manner on the drive of the other. It may therefore happen particularly in starting the machines that the initial delivery of a sheet into the corner by the first machine will not be timed to the operation of the feeder or suction roll 102 of the second machine. If therefore the two machines are independently put in operation and a sheet does not initially come into the corner at the proper time to be taken out by the suction roller 102 and delivered to the gate of the second machine, all that is lost is the initial operation of the suction roller 102. The next time the suction roll 102 operates, the sheet will be positioned and will be carried out. It may of course happen that the second sheet is now approaching the corner, but it will ride over the first sheet and in turn come into position, but that will not affect the sheet which is being carried out. It is then only necessary to adjust the speed of the second machine, so that it will operate in proper sequence and if two sheets are then in the corner the feeder of the first machine may be made inactive in the usual manner to prevent one sheet being fed thereinto. After that the two machines will work in perfect sequence.

In order to conveniently vary the relative speeds of these two independent machines, each is provided with a means for altering the change speed drive at the motor of such machine, or in other words, the speed gearing 47 of the first machine and 84 of the second machine. As this controlling mechanism is duplicated and is shown in detail in connection with the first machine, a description thereof, it is believed, will be sufficient for both.

The change speed gear mechanism is of the variable cone friction type, the cones 135 being in sets on parallel shafts and the cones of each set being movable toward and from each other and the sets being connected by an endless belt. These cones are engaged with side levers 136 fulcrumed between their ends as shown at 137 and having mountings on the oppositely threaded portions of a shaft 138. By turning this shaft in one direction the cones of one set are moved apart and the cones of the other set moved toward each other. A reverse movement of the shaft 138 reverses the respective sets of cones as well known. The shaft 138 is provided with a sprocket wheel 139, around which passes a sprocket chain 140. This sprocket chain 140 also passes around a sprocket wheel 141 on a shaft 142, which shaft passes through one of the cam wheels 31. (See Figures 10 and 13a.) As shown in Figure 13a this particular cam wheel 31 is provided with a hub 143 journaled in the frame bar, and through the hub passes the shaft 142. On the front end of this shaft is a hand wheel 144 by which the shaft 142 can be turned. As clearly shown this hand wheel is on the front side of the machine and consequently whenever it is desired to alter the speed of the machine, it is only necessary to turn the hand wheel 144, thereby through the chain 140, rotating the shaft 138, and because of the threaded mountings of the levers 136 on said shaft, the speed varying mechanism is altered.

It will thus be seen that two machines separately powered and independently operable are thus provided, eliminating the difficult necessity that has heretofore been experienced of driving one machine from the other and endeavoring to maintain a timed relation between them and the instrumentalities on which they depend for operation. In the present case, the second machine, it will be noted, not only effects the rotation of its suction roller feed device 102, but controls the periodic vacuum created therein. It also makes possible the easy separation of these two machines for independent use as such and their association for ruling sheets with right angularly disposed lines at one feeding, and either feint lining or striking or any combination of the same.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In ruling apparatus, the combination with angularly disposed ruling machines, each having ruling devices, a gate, conveyor for carrying sheets to and past the gate and the ruling devices, mechanism on each machine for actuating the gate, the ruling devices and the conveyor thereof, of a separate motor for each machine geared to said mechanism for operating it, a feeder for starting the sheets ruled by the first machine to the second machine, mechanism operated by the motor of the second machine for periodically actuating the feeder, and mechanism operated by the motor of the first machine for delivering to the feeder, the sheets ruled by said machine.

2. In ruling apparatus, the combination with angularly disposed ruling machines, each having ruling devices, a gate, a conveyor for carrying sheets to and past the gate and beneath the ruling devices, mechanism on each machine for actuating the gate, the ruling devices and the conveyor thereof, of a separate motor for each machine geared to the said mechanism for operating it, a suction roller for starting the sheets ruled by the first machine to the second machine, means operated by one of the machines for rotating the roller, and means actuated by the second machine for periodically creating suction in the roller.

3. In ruling apparatus, the combination with angularly disposed ruling machines, each having ruling devices, a gate, a conveyor for carrying sheets to and past the gate and beneath the ruling devices, mechanism on each machine for actuating the gate, the ruling devices and the conveyor thereof, of a separate motor for each machine geared to the said mechanism for operating it, a suction roller for starting the sheets ruled by the first machine to the second machine, means operated by the second machine for rotating the roller, and means actuated by the second machine for periodically creating suction in the roller.

4. In ruling apparatus, the combination with a first and a second ruling machine, each having ruling devices and means for carrying sheets to be ruled past the ruling devices, of a motor, mechanism driven by the motor for actuating the ruling devices of the second machine and operating the sheet carrying means thereof at different rates of speed with respect to the ruling devices, a transfer device for starting the sheets ruled by the first machine to the second machine, means associated with the sheet carrying means of the second machine for driving the transfer device at different rates of speed corresponding to those of the sheet carrying means, and means operated by the second machine for periodically timing the operation of the transfer device.

5. In ruling apparatus, the combination with a first ruling machine and a second ruling machine, each having ruling devices and means for carrying sheets to be ruled past the ruling devices, of cam mechanism for actuating the ruling devices of the second machine, a motor for driving the cam mechanism at predetermined rates of speed, a speed change gear mechanism interposed between the cam mechanism and sheet carrier of the second machine for driving the sheet carrier at different rates of speed with respect to the cam mechanism, a feeding device for starting to the second machine, the sheets ruled by the first machine, means for operating the feeding device from the sheet carrier of the second machine and at variable rates of speed determined thereby, and means operated by the second machine for periodically timing the operation of the transfer device.

6. In ruling apparatus, the combination with a first ruling machine and a second ruling machine, each having ruling devices and means for carrying sheets to be ruled past the ruling devices, of cam mechanism for actuating the ruling devices of the second machine, a motor for driving the cam mechanism at predetermined rates of speed, a speed change gear mechanism interposed between the cam mechanism and sheet carrier of the second machine for driving the sheet carrier at different rates of speed with respect to the cam mechanism, a suction roller for starting to the second machine, the sheets ruled by the first machine, means for rotating the suction roller in timed relation to the sheet carrier of the second machine and at variable rates of speed determined thereby, and means operated by the second machine in timed relation to the cam mechanism thereof for periodically creating suction in the suction roller.

7. In ruling apparatus, the combination with a first ruling machine and a second ruling machine, each having ruling devices and a conveyor for carrying the sheets successively past the ruling devices, of a motor for separately operating each machine, cam mechanism for operating the ruling devices of the second machine, a drive connection between the motor for the second machine and the cam mechanism, a change speed gearing between the cam mechanism and the conveyor of the second machine, a rotatable suction roller for starting into the second machine, the sheets that have been ruled by the first machine, and means operated by the second machine in timed relation to the cam mechanism of said second machine for periodically creating suction in the suction roller.

8. In ruling apparatus, the combination with a first ruling machine and a second ruling machine, each having ruling devices and a conveyor for carrying the sheets successively past the ruling devices, of a motor for separately operating each machine, a drive shaft on an intermediate portion of the second machine, a clutch connection between the second machine's motor and the drive shaft, cam mechanism for operating the ruling devices of the second machine driven by the drive shaft and located in advance thereof, a change speed gear mechanism for operating the sheet carrier of the second machine and operated by the drive shaft and located rearwardly thereof, a rotatable suction roller for starting into the second machine, the sheets ruled by the first machine, means actuated by the change speed gear for rotating the suction roller, a valve for controlling the suction in the suction roller, and mechanism for periodically operating the valve, operated by the cam mechanism of the second machine.

9. In ruling apparatus, the combination with a first ruling machine and a second ruling machine, each having ruling devices and a conveyor for carrying the sheets past the ruling devices, of separate driving means for the different machines, a suction roller operated by the second machine for feeding to the second machine, the sheets ruled by the first machine, means operated by the second machine for periodically creating suction in the suction roller, and means governed by the sheets ruled by the first machine for making effective in the suction roller, the vacuum thus periodically created.

10. In ruling apparatus, the combination with a first ruling machine and a second ruling machine, each having ruling devices and a conveyor for carrying the sheets past the ruling devices, of separate driving means for the different machines, a rotary suction roller for feeding sheets from the first machine to the second machine, means operated by the second machine for rotating the roller, vacuum creating means connected to the suction roller, a valve controlling communication between the vacuum creating means and the roller, means actuated by the second machine for operating the valve, said suction creating means having a relief vent that communicates with the roller to prevent vacuum therein, and means operated by the first machine for presenting sheets ruled thereby to the suction roller and to the vent to close the latter.

ALBERT BROADMEYER.